US008814667B2

(12) United States Patent
Caspers et al.

(10) Patent No.: US 8,814,667 B2
(45) **Date of Patent: *Aug. 26, 2014**

(54) WAGERING GAME PROVIDING A PROGRESSIVE AWARD HAVING AN ACTUAL VALUE DETERMINED BY FOLLOW-UP GAME PLAY

(75) Inventors: Christopher J. Caspers, Erskineville (AU); Peter R. Hopkins, Kensington (AU)

(73) Assignee: WMS Gaming Inc., Waukegan, IL (US)

(*) Notice: Subject to any disclaimer, the term of this patent is extended or adjusted under 35 U.S.C. 154(b) by 69 days.

This patent is subject to a terminal disclaimer.

(21) Appl. No.: 13/598,189

(22) Filed: Aug. 29, 2012

(65) Prior Publication Data

US 2012/0329552 A1 Dec. 27, 2012

Related U.S. Application Data

(63) Continuation of application No. 12/481,047, filed on Jun. 9, 2009, now Pat. No. 8,282,474, which is a continuation of application No. 10/594,403, filed as application No. PCT/US2005/008951 on Mar. 18, 2005, now Pat. No. 7,874,915.

(60) Provisional application No. 60/557,788, filed on Mar. 30, 2004.

(51) Int. Cl.
*A63F 13/00* (2014.01)

(52) U.S. Cl.
USPC .................. 463/27; 463/16; 463/26; 463/40; 463/41; 463/42

(58) Field of Classification Search
USPC ............................ 463/16, 18, 19, 20, 40–42
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,861,041 | A | 8/1989 | Jones et al. | 273/292 |
| 4,948,134 | A | 8/1990 | Suttle et al. | 273/85 |

(Continued)

FOREIGN PATENT DOCUMENTS

| | | | |
|---|---|---|---|
| CA | 2 334 546 | 8/2001 | G07F 17/34 |
| DE | 195 15 983 A1 | 11/1996 | G07F 17/34 |

(Continued)

OTHER PUBLICATIONS

Article for "Easy Riches" by Sigma Game, Strictly Slots, 1 page (Aug. 2001).

(Continued)

*Primary Examiner* — David L Lewis
*Assistant Examiner* — Ross Williams
(74) *Attorney, Agent, or Firm* — Nixon Peabody LLP

(57) ABSTRACT

A gaming system includes an input device for receiving wagers to lay a wagering game in which the player is eligible to win first and second progressive award levels. At least one display device is configured to display a monetary value for the first progressive award level and a number of free spins for the second progressive award level. The gaming system includes two sets of reels, each set being associated with a respective mathematical model. A controller increments the monetary value and the number of free spins based on plays of the wagering game, and awards current values of the monetary value and the number of free spins in response to respective triggering events.

20 Claims, 5 Drawing Sheets

(56) References Cited

U.S. PATENT DOCUMENTS

| | | | | |
|---|---|---|---|---|
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,066 | A | 12/1999 | Moody | 273/292 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,190,255 | B1 | 2/2001 | Thomas et al. | 463/20 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,325,375 | B1 | 12/2001 | Potter et al. | 273/292 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,609,973 | B1 | 8/2003 | Weiss | 463/20 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,694 | B1 | 3/2004 | Nordman | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,357,716 | B2 | 4/2008 | Marks et al. | 463/27 |
| 2001/0004607 | A1 | 6/2001 | Olsen | 463/26 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0064805 | A1 | 4/2003 | Wells | 463/39 |
| 2003/0069056 | A1 | 4/2003 | Cormack et al. | 463/16 |
| 2003/0109306 | A1 | 6/2003 | Karmarkar | 463/40 |
| 2003/0125102 | A1 | 7/2003 | Cannon | 463/20 |
| 2003/0148807 | A1 | 8/2003 | Acres | 463/40 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0033829 | A1 | 2/2004 | Pacey et al. | 463/20 |
| 2004/0038741 | A1 | 2/2004 | Gauselmann | 463/42 |
| 2004/0048644 | A1 | 3/2004 | Gerrard et al. | 463/16 |
| 2004/0048646 | A1 | 3/2004 | Visocnik | 463/16 |
| 2004/0048649 | A1 | 3/2004 | Peterson et al. | 463/20 |
| 2004/0092304 | A1 | 5/2004 | George | 453/29 |
| 2005/0003880 | A1 | 1/2005 | Engleman | 463/16 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2005/0239542 | A1 | 10/2005 | Olsen | 463/27 |
| 2006/0003829 | A1 | 1/2006 | Thomas | 463/20 |
| 2006/0019737 | A1 | 1/2006 | Yang | 463/19 |

(56) References Cited

U.S. PATENT DOCUMENTS

| | | | | |
|---|---|---|---|---|
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2007/0213114 | A1 | 9/2007 | Caspers et al. | 463/16 |

FOREIGN PATENT DOCUMENTS

| | | | | |
|---|---|---|---|---|
| DE | 196 24 321 | A1 | 1/1998 | G07F 17/32 |
| EP | 0 521 599 | A1 | 1/1993 | G07F 17/34 |
| GB | 2 153 572 | A | 8/1985 | G07F 17/34 |
| GB | 2 181 589 | A | 4/1987 | G07F 17/34 |
| GB | 2 242 300 | A | 9/1991 | G07F 17/34 |
| GB | 2 313 792 | A | 10/1997 | A63F 5/00 |
| GB | 2 333 880 | A | 8/1999 | G07F 17/34 |
| WO | WO 99/03078 | A1 | 1/1999 | G07F 17/34 |
| WO | WO 99/19037 | A1 | 4/1999 | A63F 9/22 |
| WO | WO 01/33478 | A1 | 5/2001 | G06F 19/00 |
| WO | WO 03/026754 | A1 | 4/2003 | A63F 5/00 |
| WO | WO 03/083789 | A1 | 10/2003 | |
| WO | WO 2005/099425 | A2 | 10/2005 | |
| WO | WO 2006/039349 | A2 | 4/2006 | A63F 9/24 |

OTHER PUBLICATIONS

Article for “Millioniser” by Glenn Haussman, Strictly Slots, pp. 50-53, 4 pages (Mar. 2004).

Product Sheet for “Big Games Safari,” IGT, 24 pages (2000).

“New ’97 Games,” International Gaming & Wagering Business, 24 pages (Mar. 1997).

PCT International Search Report for International Application No. PCT/US2005/08951 dated Nov. 16, 2005 (3 pages).

WAGERING GAME PROVIDING A PROGRESSIVE AWARD HAVING AN ACTUAL VALUE DETERMINED BY FOLLOW-UP GAME PLAY

CROSS REFERENCE TO RELATED APPLICATIONS

This application is a U.S. Continuation Application of U.S. patent application Ser. No. 12/481,047, filed on Jun. 9, 2009, which is a U.S. Continuation Application of U.S. national phase application Ser. No. 10/594,403, filed on Sep. 26, 2006, which claims the benefit of priority of International Application No. PCT/US2005/008951, filed on Mar. 18, 2005, which claims the benefit of priority of U.S. Provisional Patent Application No. 60/557,788, filed on Mar. 30, 2004, each of which is incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to gaming terminals and gaming systems and, in particular, to a progressive wagering game that allows a player to win a progressive award having an actual value that is initially lacking when the progressive award is awarded, the actual value being determined by follow-up game play.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In the existing progressive games, players compete for a progressive jackpot that is typically a monetary award. Upon winning a progressive jackpot, a player is awarded a financial sum which is usually in the form of coins, credits, or gaming machine tokens. Alternatively, a player can be awarded a non-cash prize, such as a car, for example. While the existing progressive game features provide some enhanced excitement, there is a continuing need to develop new features for progressive games to satisfy the demands of players and operators. Preferably, such new features for progressive games will further enhance the level of player excitement.

Thus, the present invention is directed to satisfying the needs of players for enhanced excitement by enabling players to play for additional or increased monetary awards by awarding free game play or free play selections to a winner of a progressive jackpot.

SUMMARY OF THE INVENTION

According to one aspect of the present invention, a gaming system includes an input device, at least one display device, and at least one controller. The input device is configured to receive wagers from a player to play plays of a wagering game via which the player is eligible to win first and second progressive award levels. The display device is configured to display the wagering game and to display a monetary value for the first progressive award level and a number of free spins of a plurality of symbol-bearing reels for the second progressive award level. The wagering game includes a plurality of other symbol-bearing reels associated with a first mathematical model during a base portion of the wagering game, the plurality of symbol-bearing reels being associated with a second mathematical model different from the first mathematical model. The controller is configured to incrementally increase the monetary value for the first progressive award level and the number of free spins for the second progressive award level based on the plays of the wagering game. The controller is further configured to award a current value of the monetary value and a current value of the number of free spins in response to respective triggering events.

According to another aspect of the invention, a computer-implemented method is directed to conducting wagering games on a wagering game system, the wagering game system including one or more wager input devices, one or more display devices, and one or more processors. The method includes receiving, via at least one of the one or more input devices, wagers from a player to initiate plays of the wagering game via which the player is eligible to win first and second progressive award levels. The method further includes displaying, via at least one of the one or more display devices, the wagering game and a monetary value for the first progressive award level and a number of free spins of a plurality of symbol-bearing reels for the second progressive award level. The wagering game includes a plurality of other symbol-bearing reels associated with a first mathematical model during a base portion of the wagering game, the plurality of symbol-bearing reels being associated with a second mathematical model different from the first mathematical model. The monetary value is incrementally increased, via at least one of the one or more processors, for the first progressive award level and the number of free spins for the second progressive award level based on the plays of the wagering game. At least one of the one or more processors award a current value of the monetary value and a current value of the number of free spins in response to respective triggering events.

According to yet another aspect of the invention, one or more physical machine-readable storage media include instructions which, when executed by one or more processors, cause the one or more processors to perform a plurality of operations. The operations include receiving wagers, via an input device, from a player to play plays of the wagering game via which the player is eligible to win first and second progressive award levels. The operations further include displaying on at least one display device the wagering game and a monetary value for the first progressive award level and a number of free spins of a plurality of symbol-bearing reels for the second progressive award level. The wagering game includes a plurality of other symbol-bearing reels associated with a first mathematical model during a base portion of the wagering game, the plurality of symbol-bearing reels being associated with a second mathematical model different from the first mathematical model. The operations also include incrementally increasing the monetary value for the first progressive award level and the number of free spins for the second progressive award level based on the plays of the wagering game. A current value of the monetary value and a current value of the number of free spins is awarded in response to respective triggering events.

According to yet another aspect of the invention, a gaming system includes one or more input devices, one or more display devices, one or more processors, and one or more memory devices storing instructions that, when executed by at least one of the one or more processors, cause the gaming system to perform a plurality of operations. The operations include receiving an input, via at least one of the one or more input devices, indicative of a wager from a player to play plays of a wagering game via which the player is eligible to win first and second progressive award levels. The operations further include displaying, via at least one of the one or more display devices, the wagering game, a monetary value for the first progressive award level, and a number of free spins of a plurality of symbol-bearing reels for the second progressive award level. The wagering game includes a plurality of other symbol-bearing reels associated with a first mathematical model during a base portion of the wagering game, the plurality of symbol-bearing reels being associated with a second mathematical model different from the first mathematical model. The operations further include incrementally increasing the monetary value for the first progressive award level and the number of free spins for the second progressive award level based on the plays of the wagering game. The operations also include awarding a current value of the monetary value and a current value of the number of free spins in response to respective triggering events.

The above summary of the present invention is not intended to represent each embodiment or every aspect of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
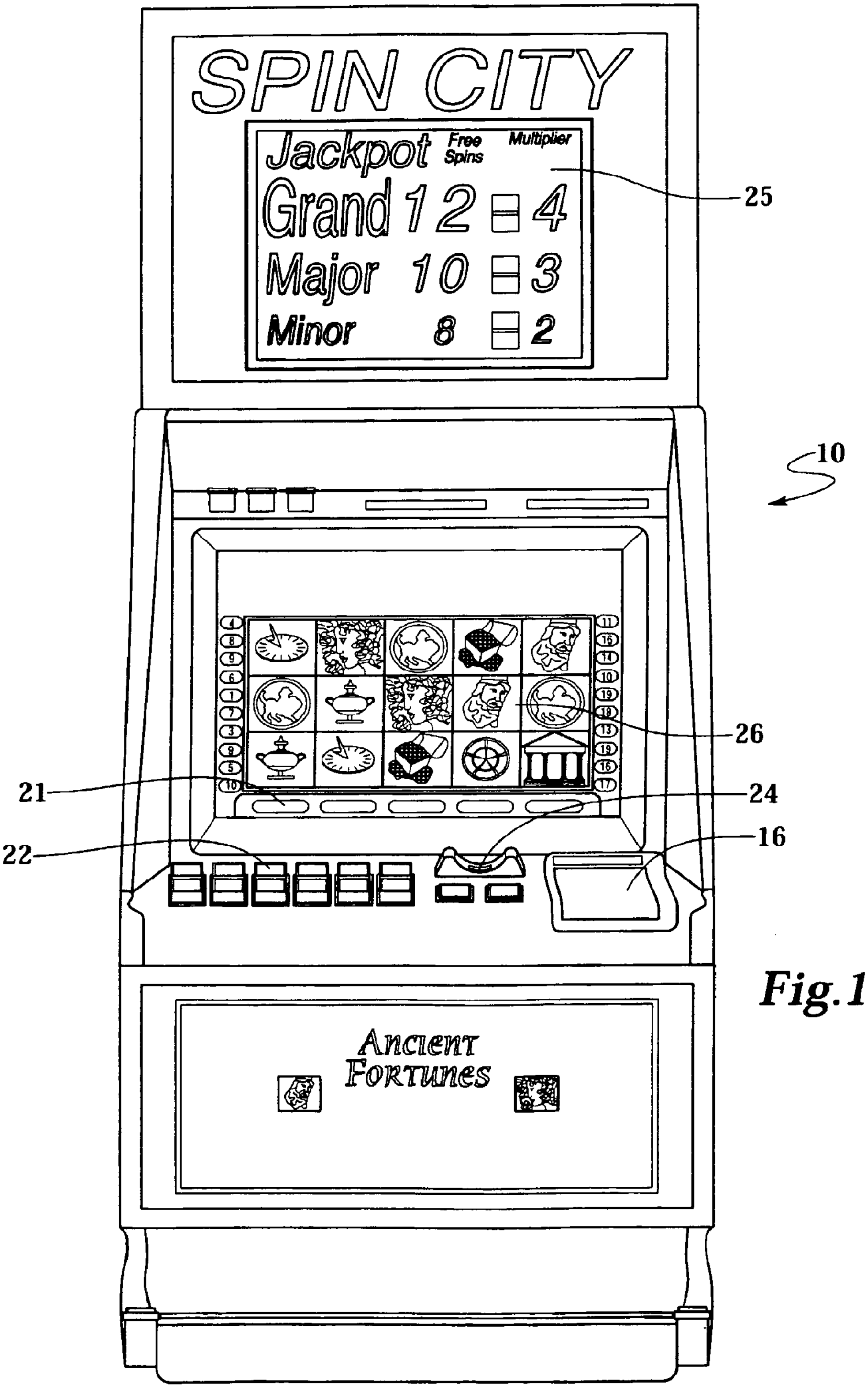
FIG. 1 illustrates a gaming terminal that is useful for operating an enhanced progressive game in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

The gaming terminal 10 includes input devices, such as a wager acceptor 16, a touch screen 21, a push-button panel 22, and a player-identification card reader 24. For outputs, the gaming terminal 10 includes a main display 26 for displaying information about the basic wagering game. The main display 26 can also display information about a progressive wagering game. The gaming terminal 10 also includes a progressive game display 25 for displaying one or more award amounts of a progressive game. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a note acceptor to input value to the gaming terminal 10. Or, the wager acceptor 16 may include a card-reading device for reading a card that has a recorded monetary value with which it is associated. The card may also authorize access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 can also display a progressive game associated with a basic wagering game. The main display 26 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Alternatively, the gaming terminal 10 may have a number of mechanical reels to display the game outcome.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10.

A player begins play of the basic wagering game by inserting a wager input into the wager input accepter 16 of the gaming terminal 10. A player can select play by either using the touch screen 21 or push-button panel 22. The basic game consists of a plurality of symbols on reels that are displayed along a payline, yielding a plurality of outcomes of the basic game. Such outcomes are randomly selected. One of the plurality of randomly selected outcomes is a progressive-award outcome. The progressive-award outcome of the basic wagering game can also include other variations of symbols such that different levels of progressive awards can be achieved.

The progressive-award outcome awards a player a progressive award. Initially, the progressive award lacks an actual value. Instead, the progressive award has an expected value that is the dollar amount that should be won by a player, on average in the long term, in exact accordance with the statistical advantage of the wagering games played at the gaming terminal. In a first embodiment of the present invention, the progressive award is a number of free plays or spins of the basic wagering game. The number of free spins awarded to a player is determined by the outcome of the basic game. Once a player plays one or more of the free spins of the basic game, the player is awarded the monetary value associated with the randomly selected outcomes of those free spins. Thus, the progressive award subsequently achieves an actual value that is determined by follow-up game play. The free spins or plays may also yield a non-monetary value based on outcomes of the free spins (i.e., a car or other non-cash prize), or even no value at all. In each case, however, the progressive award achieves an actual value, even if that value is zero.

Figure 3:
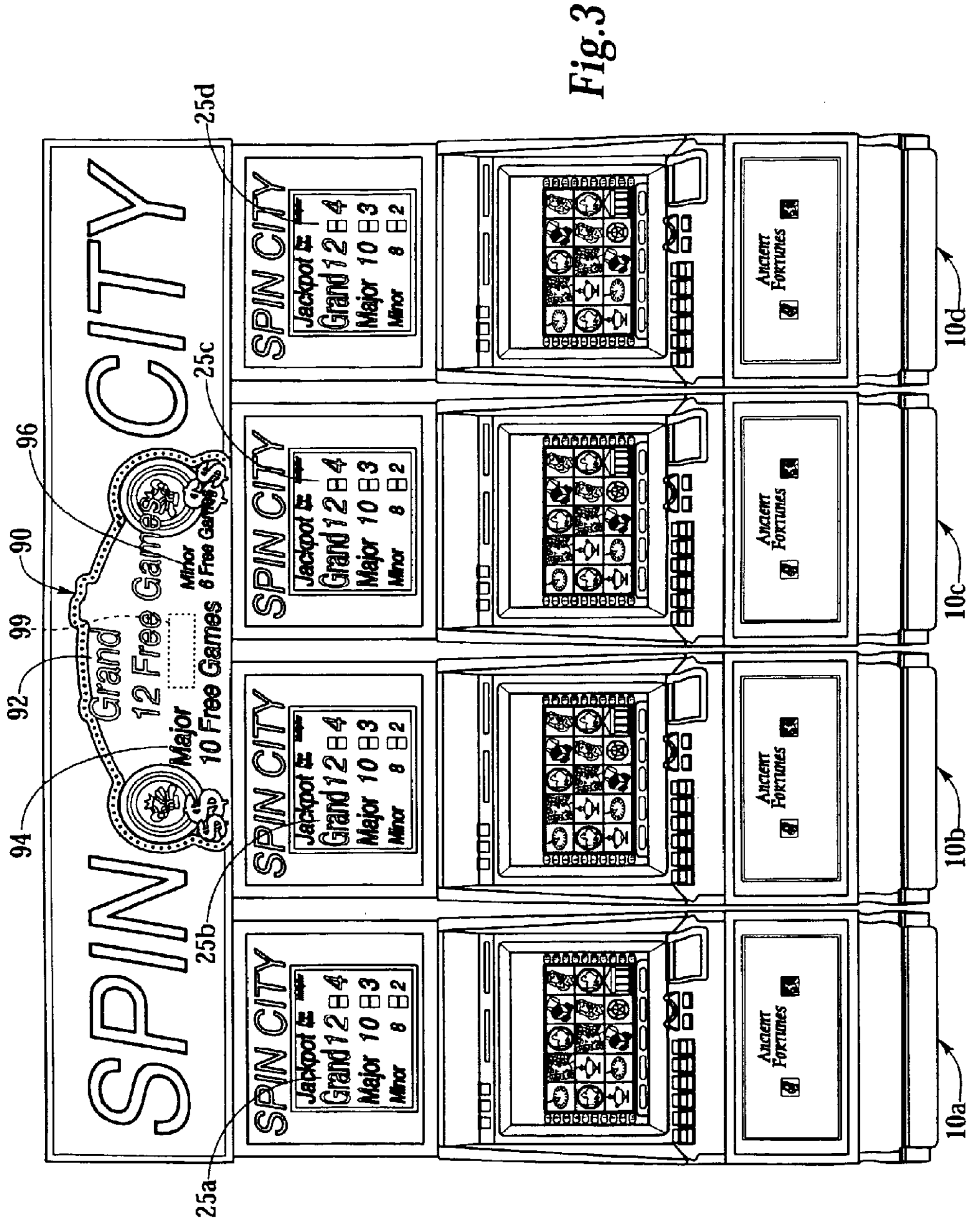
FIG. 3 illustrates a plurality of gaming terminals that are useful for operating an enhanced progressive game having progressive awards in accordance with the present invention.

As shown in FIGS. 1 and 3, the progressive award can have multiple award amounts. For example, the progressive game display 25 of the gaming terminal shown in FIG. 1 shows three levels of a progressive award (i.e., "Grand," "Major" and Minor"), each associated with a different award amount (i.e., 12, 10 and 8 free spins). Initially, the number of free plays or spins associated with a progressive award is determined by a minimum number of free plays or spins (i.e., the "startup values"). The minimum number of free plays or spins may be the same or different for each progressive award. For example, the minimum number of free plays or spins can be determined to be 5 for each progressive award. Alternatively, the minimum number of free plays or spins can be determined to be 5, 25 and 50 for a first, second and third progressive award. In addition, a maximum number of free plays or spins can be determined for each progressive award. The maximum number of free plays or spins can also be the same or different for each progressive award. For example, the maximum number of free plays or spins can be determined to be 25 for each progressive award or, alternatively, the maximum number of free plays or spins can be determined to be 25, 50 and 100 for a first, second and third progressive award.

A progressive award can also be associated with a multiplier value. The multiplier value can be used to multiply a monetary award obtained from free game play by the multiplier value. Thus, a player's winnings can be increased as a result of the multiplier value. The multiplier value can be the same or different for different progressive awards. As an example, the multiplier value for a first, second and third progressive award can be 3, 5 and 7.

In addition to the multiplier being a fixed value, the multiplier may increment as a function of the wager input, just as the free spins of the progressive award increment upwardly. The multiplier's increment could be independent of, or dependent on, the incrementing of the free spins that are achieved by the progressive award.

Figure 2:
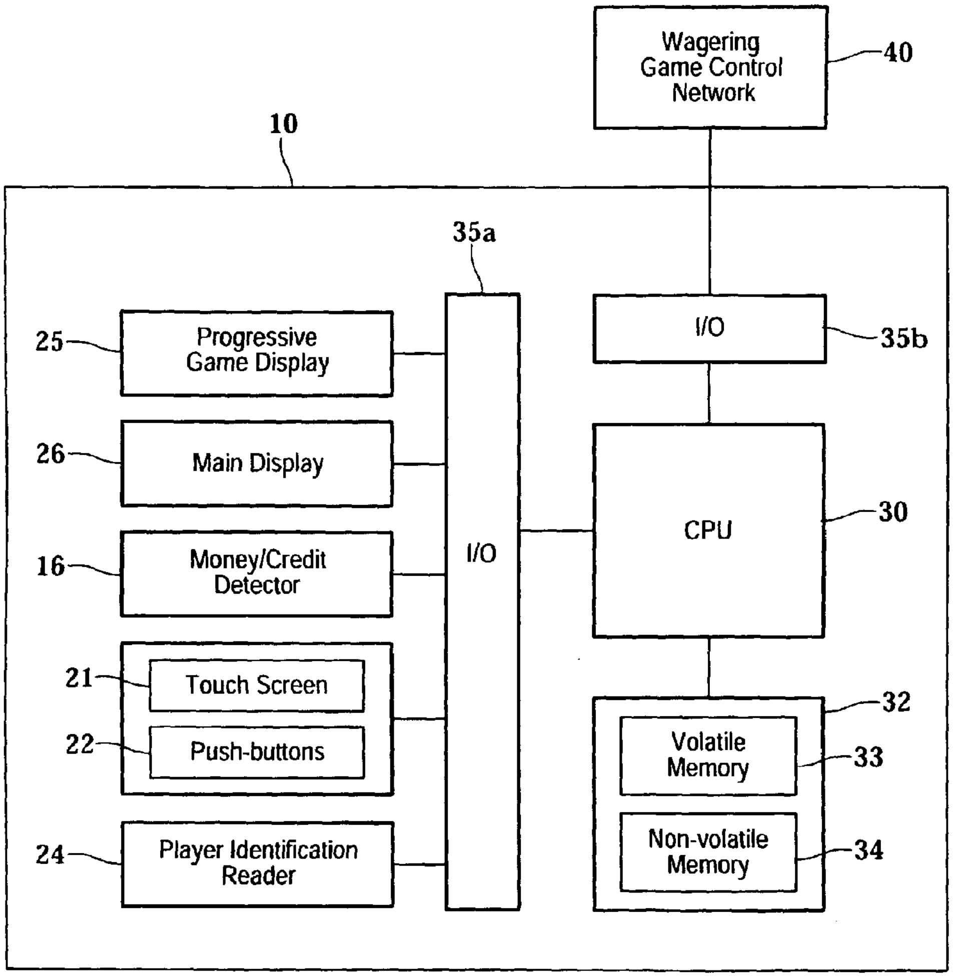
FIG. 2 illustrates a control system that is used in conjunction with the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

The gaming terminal 10 is typically operated as part of a game control network 40 having control circuitry and memory devices. The gaming terminal 10 often has multiple serial ports, each port dedicated to providing data to a specific host computer system that performs a specific function (e.g., accounting system, player-tracking system, progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection to the game control network 40. The game control network 40 can be the progressive game controller that controls operation of the progressive game, as described below.

FIG. 3 illustrates a plurality of gaming terminals 10*a*, 10*b*, 10*c*, 10*d* that can be used for operating the enhanced progressive game as displayed on signage 90 with multiple progressive awards 92, 94, 96. The plurality of gaming terminals 10*a*, 10*b*, 10*c*, 10*d* may be coupled to a progressive game controller 99 that controls the overall function of the progressive game. The progressive game controller 99 increases the progressive award based on wager inputs that are received at the plurality of gaming terminals 10*a*, 10*b*, 10*c*, 10*d*. The progressive game controller 99 also controls the signage 90. In response to a progressive-award outcome in a basic game, the progressive game controller awards the progressive award, which may include free plays or spins of the basic game, or a chance to play a progressive game, as described, for example, in FIGS. 5-6.

The progressive game displays 25*a*, 25*b*, 25*c*, 25*d* that are attached to each of the plurality of gaming terminals 10*a*, 10*b*, 10*c*, 10*d* can display an amount of the single highest progressive award (here, the "Grand") or all of the progressive awards (here, the "Grand," "Major" or "Minor"). As the amount of the progressive awards increase, the progressive game controller changes the values of the progressive awards on the signage 90 and the gaming terminals 10*a*, 10*b*, 10*c*, 10*d*.

Figure 4:
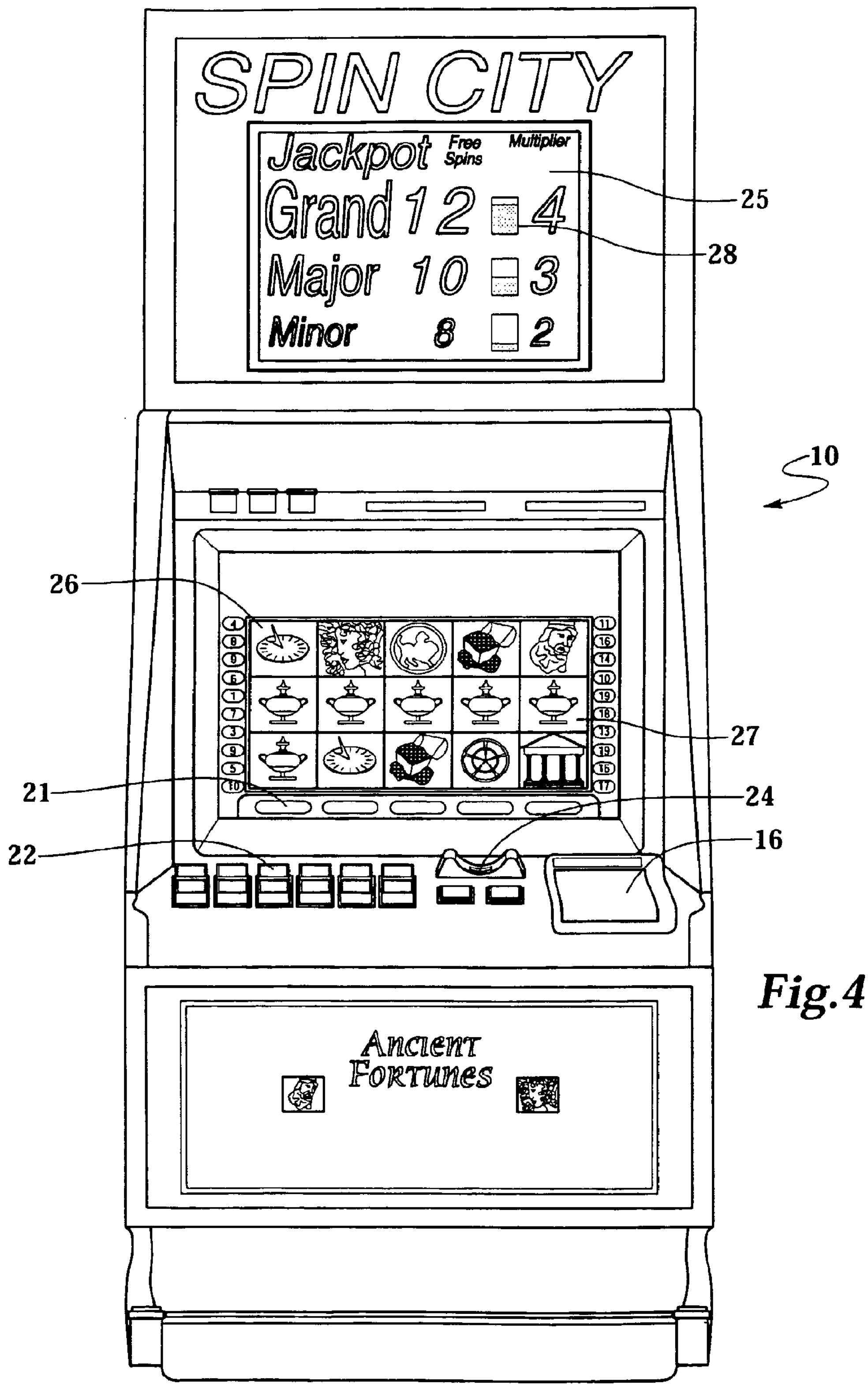
FIG. 4 illustrates a gaming terminal displaying a basic game having a progressive-award outcome in accordance with the present invention.

FIG. 4 illustrates a progressive-award outcome 27 which is associated with five identical symbols displayed and aligned on a selected payline on the main display 26 of the basic game. Once the progressive-award outcome is achieved, the player is awarded some type of follow-up play that has an expected value. As the progressive award increases, as displayed on the progressive game display 25, the expected value increases. This increased expected value may manifest itself in awarding additional spins of the basic game or through some varied game play of a progressive game that is activated in response to the progressive-award outcome being achieved, as described below.

Because the progressive awards provide an award as defined by an integer (i.e., 12, 13, 14 free spins), each of the progressive game displays 25*a*, 25*b*, 25*c*, 25*d* can include a display for displaying incremental values between the integers. FIG. 4 shows the incremental value display 28 having portions of the display partially shaded in accordance with the incremental value. The incremental value is the fraction of a free game between the jackpot value displayed on the progressive game display and the next whole number value. For example, the incremental value can be increasing from a value of $1/100$ of a free game to $99/100$ of a free game, and then start over with the next whole number jackpot value. The incremental value increases (i.e., from $1/100$ to $99/100$) as the players of the progressive game continue to deposit wager inputs. In another embodiment, the incremental value display 28 does not show the actual value as it increases, but simply shows images giving the impression that the jackpot value is increasing, such as a rotating barber's poll.

Another way in which a progressive game does not award "actual value," but "expected value" requiring follow-up play, is the use of a progressive game that requires player inputs. In this embodiment, the present invention includes a basic wagering game and a progressive game that must be played after the basic game yields a progressive-award outcome. The progressive game is presented to a player when he or she achieves a progressive-award outcome in the basic wagering game. The progressive game can include a player-selectable grid of options, wherein some of the options are associated with a value. Other options are game-terminating options that end play of the progressive game. The player is allowed to select an option which is revealed to the player upon selection. If the selected option is associated with a value, the player is then awarded the value of the option. If a game-terminating option is selected, then the progressive game is terminated. A player can be allowed to continue selecting options until a game-terminating option is selected. Thus, several options associated with a value may be selected by a player, which increases the actual value of the progressive award, before a game-terminating option is selected.

Figure 5:
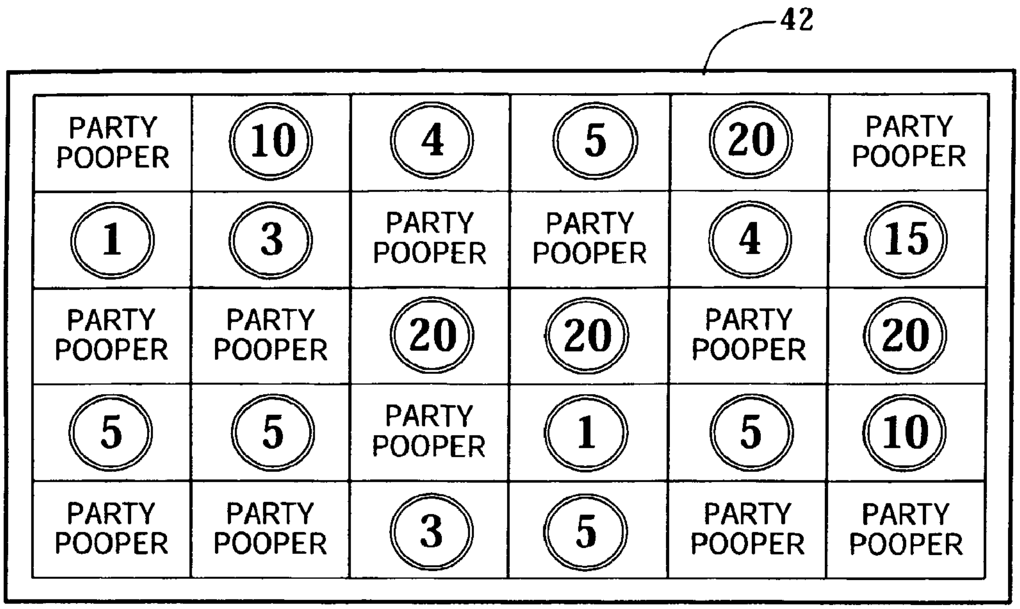
FIG. 5 illustrates a first embodiment of a progressive game having a display with player-selectable options in accordance with the present invention.
Figure 6:
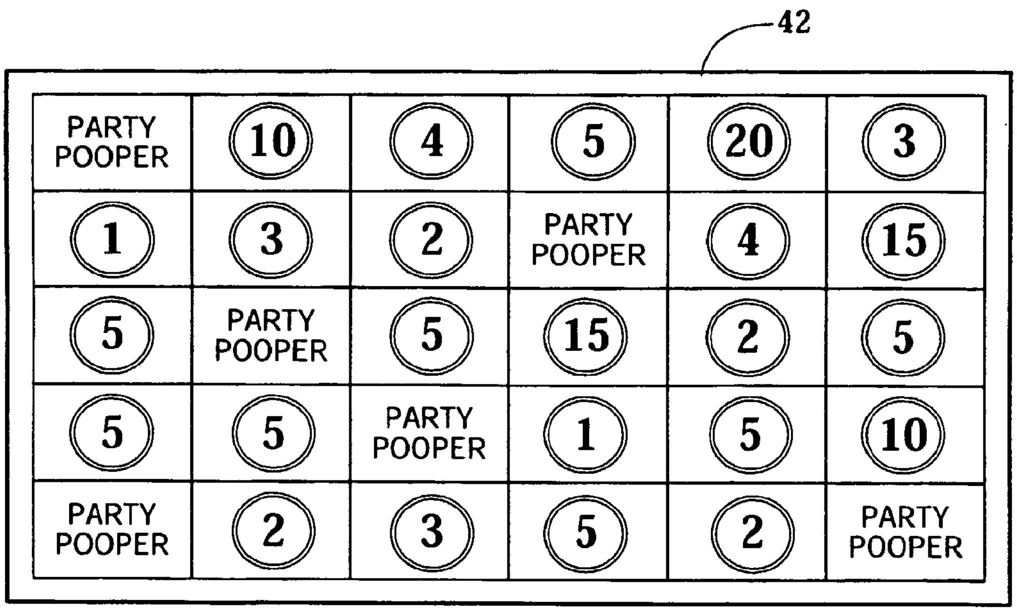
FIG. 6 illustrates a second embodiment of a progressive game having a display with player-selectable options in accordance with the present invention.

For example, FIGS. 5 and 6 illustrate embodiments of the present invention wherein a player has been awarded a better chance to achieve a better financial award in a progressive game as a result of the player achieving a better progressive-award outcome in the basic game. FIGS. 5 and 6 each illustrate a progressive game having a grid 42 with 30 player-selectable options. Each grid option is associated with one of a plurality of numbers or symbols that represents a game-terminating option (here, a "party pooper" symbol). The options with numbers can be multiplier values for increasing a financial award obtained by the player. In FIG. 5, the grid option that corresponds to the first row, second column, has a "10" value. This means that a player's financial award is ten credits. The player-selectable options can also be associated with game-terminating options, such as the "party pooper" symbol. Once a player makes a selection associated with one of these "party pooper" symbols, the game is terminated. As described above, a player can be allowed to continue to select player-selectable options with value until he or she selects a "party pooper" symbol that terminates game play.

The progressive game of FIG. 5 shows a baseline progressive game that is achieved when a player wins a progressive-award outcome in the basic game. The baseline progressive game of FIG. 5 shows a grid 42 containing, for example, a total of twelve "party pooper" symbols. As the progressive-award amounts as shown on the progressive game displays 25 (or signage 90) continue to increase with additional wager inputs at the progressive gaming terminals, the number of "party pooper" symbols can continue to decrease in an incremental value to the next whole number value. For example, the twelve "party pooper" symbols of the progressive game shown in FIG. 5 can increment down to eleven "party pooper" symbols and continue incrementing down until it reaches the number of "party pooper" symbols contained in the progressive game of FIG. 6, which has only six "party pooper" symbols. The number of "party pooper" symbols can continue incrementing down until only one or even zero "party pooper" symbols are contained in the progressive game. This allows a player to have a better chance in the progressive game of selecting a value associated with a financial award (i.e., a higher expected value). As a result, this increases the excitement level of a player because he or she knows that he or she has a better chance of avoiding game-terminating options so as to increase the value of the progressive game. As with the first embodiment of FIGS. 1-4, it is clear that the follow-up game play dictates the actual value of the progressive award.

Each of the progressive awards can be associated with a progressive game having a different number of game-terminating symbols. For example, a "Minor" progressive award can be associated with a baseline progressive game having twelve game-terminating options. A “Major” progressive award can be associated with a baseline progressive game having eight game-terminating options. And a “Grand” progressive award can be associated with a baseline progressive game that has only five game-terminating options. Each of the progressive awards having a progressive game then increments down from the baseline number of game-terminating options to one or even zero game-terminating options.

Alternatively, the progressive-award outcome that is achieved in the basic game may trigger different progressive games, which may or may not include player-selectable options, that are associated with different progressive award amounts (i.e., “Grand,” “Major” and “Minor”). For example, the progressive game can simply be a second type of slot-machine game with reel symbols, math, and themes that are different from those in the basic game. After the progressive award has been triggered, the images of the different progressive award amounts (i.e., “Grand,” “Major” and “Minor”) on the progressive game display 25 are temporarily terminated and the slot-machine progressive game is then displayed on the progressive game display 25. Thus, the various gaming terminals in a bank that are competing for the progressive award can have different themes and game-play features, but still play the same progressive game if the progressive award is triggered. As with the previous examples, the progressive award subsequently achieves an actual value (which may be zero) that is determined by follow-up game play.

Thus far, the progressive award of the present invention has been described as being triggered based on a player achieving a progressive-award outcome in the basic game. Another possibility for awarding the progressive award is to perform a random selection that dictates whether the progressive award is won after each credit (or a certain number of credits) is wagered in the basic game (the “credit-triggering mechanism”).

In one embodiment of the credit-triggering mechanism, after a player plays the basic game, each of the credits that a player wagers in the basic game is used to determine if a progressive award has been won. For each credit played, a separate random determination is made to establish if a progressive award has been triggered for each progressive award level. When a progressive award has been won, each credit that remains is used to determine whether the player is awarded a consolation prize. In this example, the progressive award can only be won once per game cycle, but the consolation prize can be won multiple times. The consolation prize may be, for example, two free spins in the basic game, or some fixed credit value.

In another embodiment of the credit-triggering mechanism, after a player plays the basic game, each of the credits that a player wagers in the basic game is used to determine if the progressive award has been won. For each credit played, a single determination is made to determine if any of the multiple progressive awards is triggered. If a progressive award has been won, each credit that remains after the progressive award has been won is used to determine the particular progressive award level that is won (e.g., Grand, Major, Minor). For example, if a 200 credit wager is made, the progressive game controller will check 200 times whether a progressive award will be triggered. If a progressive award is triggered on the $78^{th}$ time, then the remaining 122 credits will be used to determine which progressive award level is won.

In yet another embodiment of this mechanism, a progressive award can be triggered only after a player has wagered a certain wager amount. For example, the possibility of achieving a progressive award is triggered only after a player has bet the number of credits that is equivalent to $5.00. Thus, a player who is wagering $1.00 on a basic game would have to play five games to trigger the possibility of winning a progressive award.

While the present invention has been described with reference to one or more particular embodiments, those skilled in the art will recognize that many changes may be made thereto without departing from the spirit and scope of the present invention. For example, this novel progressive award feature having an expected value can be combined with traditional progressive awards having an actual value (e.g., one award level has an “expected value,” as described above, while a second award level has an “actual value”). Each of these embodiments and obvious variations thereof is contemplated as falling within the spirit and scope of the claimed invention, which is set forth in the following claims.

What is claimed is:

1. A gaming system, comprising:

an input device configured to receive wagers from a player to play plays of a wagering game via which the player is eligible to win first and second progressive award levels;

at least one display device to display a monetary value for the first progressive award level and a number of free spins of a plurality of symbol-bearing reels for the second progressive award level, the wagering game including a plurality of other symbol-bearing reels associated with a first mathematical model during a base portion of the wagering game, the plurality of symbol-bearing reels being associated with a second mathematical model different from the first mathematical model; and at least one controller configured to incrementally increase the monetary value for the first progressive award level and the number of free spins for the second progressive award level based on the plays of the wagering game, and award a current value of the monetary value and a current value of the number of free spins in response to respective triggering events.

2. The gaming system of claim 1, further comprising at least one indicator on the at least one display device for displaying fractional changes between a current numerical value and a next numerical value of at least one of the first and second progressive award levels.

3. The gaming system of claim 1, wherein respective randomly selected outcomes of the free spins are associated with another monetary or non-monetary values.

4. The gaming system of claim 3, wherein the another monetary value includes zero.

5. The gaming system of claim 1, wherein the at least one controller is configured to incrementally increase the number of free spins based on the received wagers.

6. A computer-implemented method of conducting wagering games on a wagering game system, the wagering game system including one or more input devices, one or more display devices, and one or more processors, the method comprising:

receiving, via at least one of the one or more input devices, wagers from a player to initiate plays of the wagering game via which the player is eligible to win first and second progressive award levels;

displaying, via at least one of the one or more display devices, a monetary value for the first progressive award level and a number of free spins of a plurality of symbol-bearing reels for the second progressive award level, the wagering game including a plurality of other symbol-bearing reels associated with a first mathematical model during a base portion of the wagering game, the plurality of symbol-bearing reels being associated with a second mathematical model different from the first mathematical model;

incrementally increasing, via at least one of the one or more processors, the monetary value for the first progressive award level and the number of free spins for the second progressive award level based on the plays of the wagering game; and awarding, via at least one of the one or more processors, a current value of the monetary value and a current value of the number of free spins in response to respective triggering events.

7. The method of claim 6, further comprising displaying, via at least one of the one or more display devices, fractional changes between a current numerical value and a next numerical value of at least one of the first and second progressive award levels.

8. The method of claim 6, wherein respective randomly selected outcomes of the free spins are associated with another monetary or non-monetary values.

9. The method of claim 6, wherein the incrementally increasing includes incrementally increasing the number of free spins based on the received wagers.

10. The method of claim 6, wherein the another monetary value includes zero.

11. One or more physical machine-readable storage media including instructions which, when executed by one or more processors, cause the one or more processors to perform operations comprising:

receiving wagers, via an input device, from a player to play plays of the wagering game via which the player is eligible to win first and second progressive award levels;

displaying on at least one display device a monetary value for the first progressive award level and a number of free spins of a plurality of symbol-bearing reels for the second progressive award level, the wagering game including a plurality of other symbol-bearing reels associated with a first mathematical model during a base portion of the wagering game, the plurality of symbol-bearing reels being associated with a second mathematical model different from the first mathematical model;

incrementally increasing the monetary value for the first progressive award level and the number of free spins for the second progressive award level based on the plays of the wagering game; and awarding a current value of the monetary value and a current value of the number of free spins in response to respective triggering events.

12. The one or more physical machine-readable storage media of claim 11, wherein the operations further comprise displaying on the at least one display device fractional changes between a current numerical value and a next numerical value of at least one of the first and second progressive award levels.

13. The one or more physical machine-readable storage media of claim 11, wherein respective randomly selected outcomes of the free spins are associated with another monetary or non-monetary values.

14. The one or more physical machine-readable storage media of claim 11, wherein the incrementally increasing includes incrementally increasing the number of free spins based on the received wagers.

15. The one or more physical machine-readable storage media of claim 11, wherein the another monetary value includes zero.

16. A gaming system, comprising:

one or more input devices;

one or more display devices;

one or more processors; and one or more memory devices storing instructions that, when executed by at least one of the one or more processors, cause the gaming system to:

receive an input, via at least one of the one or more input devices, indicative of a wager from a player to play plays of a wagering game via which the player is eligible to win first and second progressive award levels, display, via at least one of the one or more display devices, a monetary value for the first progressive award level and a number of free spins of a plurality of symbol-bearing reels for the second progressive award level, the wagering game including a plurality of other symbol-bearing reels associated with a first mathematical model during a base portion of the wagering game, the plurality of symbol-bearing reels being associated with a second mathematical model different from the first mathematical model, incrementally increase the monetary value for the first progressive award level and the number of free spins for the second progressive award level based on the plays of the wagering game, and award a current value of the monetary value and a current value of the number of free spins in response to respective triggering events.

17. The gaming system of claim 16, further comprising displaying, via at least one of the one or more display devices, fractional changes between a current numerical value and a next numerical value of at least one of the first and second progressive award levels.

18. The gaming system of claim 17, wherein respective randomly selected outcomes of the free spins are associated with another monetary or non-monetary values.

19. The gaming system of claim 16, wherein the another monetary value includes zero.

20. The gaming system of claim 16, further comprising incrementally increasing the number of free spins based on the received wagers.

* * * * *